United States Patent [19]
Kitchen, Jr. et al.

[11] 3,797,656
[45] Mar. 19, 1974

[54] VEHICLE POSITIONING AND RESTRAINT APPARATUS

[75] Inventors: Elwyn L. Kitchen, Jr., Troy; Walter Cwycyshyn, Detroit, both of Mich.

[73] Assignee: General Motors Corporation, Detroit, Mich.

[22] Filed: Oct. 12, 1972

[21] Appl. No.: 296,757

[52] U.S. Cl. ............ 206/335, 105/368 T, 248/119 R
[51] Int. Cl. ..... B60p 7/08, B61d 45/00, B65d 25/62
[58] Field of Search ........ 206/65 R, 46 M; 220/1.5, 220/97 R; 105/369 R, 368 R, 368 T, 369 A; 248/119 R, 361 R

[56] References Cited
UNITED STATES PATENTS

| | | | |
|---|---|---|---|
| 1,254,920 | 1/1918 | Mathias | 105/368 R |
| 2,969,023 | 1/1961 | Chapman et al. | 105/368 T |
| 3,605,636 | 9/1971 | Blunden et al. | 105/368 T |

Primary Examiner—William T. Dixson, Jr.
Attorney, Agent, or Firm—Edward J. Biskup

[57] ABSTRACT

A vehicle positioning and restraint apparatus having a latch mechanism and parallel guide rails which slidably receive and support tie-down devices attached to the underside of a vehicle and allow the vehicle to float on its own suspension while being transported by a carrier.

4 Claims, 6 Drawing Figures

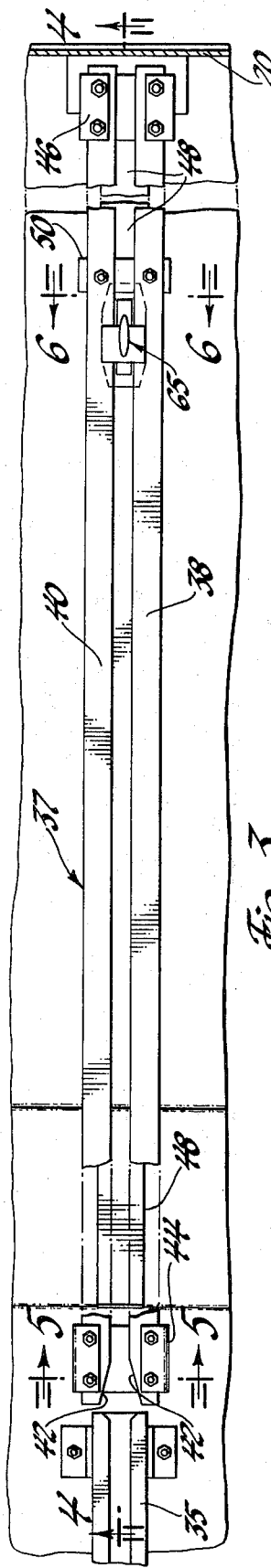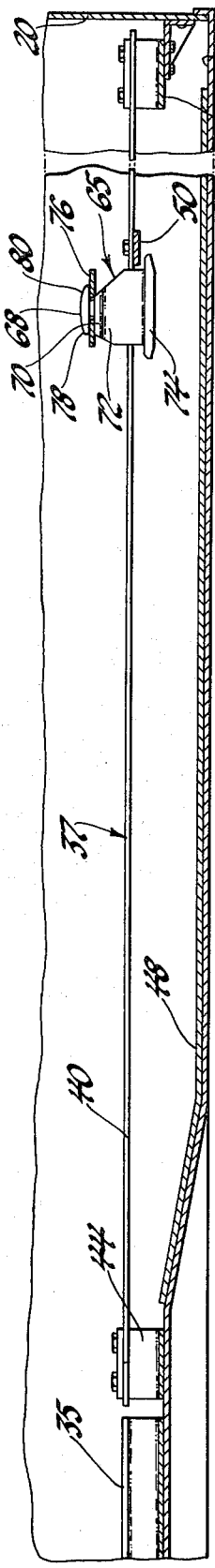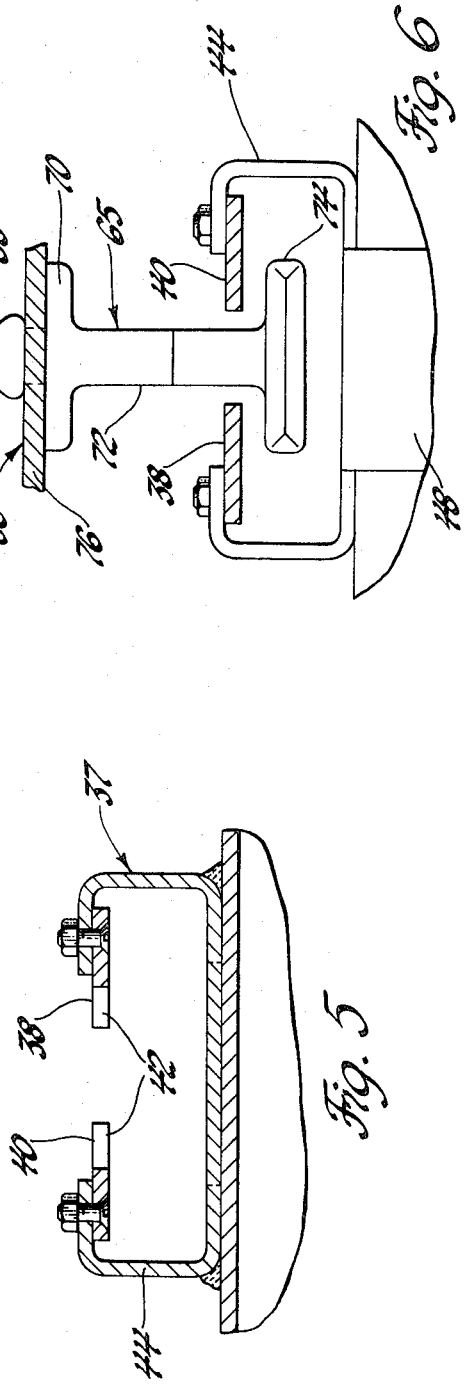

VEHICLE POSITIONING AND RESTRAINT APPARATUS

The present invention concerns an apparatus for positioning and securing automotive vehicles within a container which can be transported by railway or highway carriers. Copending patent application No. 187,625, entitled "Vehicle Positioning and Restraint Apparatus," filed Oct. 8, 1971, in the name of Cwycyshyn et al, and assigned to the assignee of this invention, discloses a restraint system which includes three parallel guide rails that cooperate with and slidably receive three tie-down devices attached to the underside of the vehicle. The outer guide rails incorporate latching mechanism which are manually operated and serve to trap the associated tie-down devices to prevent it, and accordingly the vehicle, from moving in a fore-and-aft, vertical, or a longitudinal direction relative to the transporter. The restraint system is incorporated in a portable shipping container that can be loaded onto a carrier such as a railway car.

Automotive vehicles shipped in containers of the above-described type or in other forms of carriers are frequently subjected to relatively high inertial forces during movement of the carrier. This is particularly true in the case of railway car transporters which are started in motion by a jerking action and at times travel along irregular road beds as well as misaligned rails. Under such conditions, the railway car experiences erratic sidewise and other movement with resultant high load concentration on the vehicle frame at points where the tie-down devices are attached thereto.

Accordingly, there is a need to provide some form of shock absorbing capability into the vehicle restraint arrangement so as to prevent damage from occurring to the vehicle during shipment. To this end, the present invention contemplates a positioning and restraint apparatus which serves to connect the vehicle to the transporter and incorporates a yieldable restraint device which allows the front end of the vehicle to pitch up and down and thereby causes the vehicle suspension system to absorb the shock loads which could cause excessive stress concentrations on the vehicle frame. In the preferred form, this is accomplished by having the vehicle front-end tie-down device supported by a pair of elongated straps located in a horizontal plane. The arrangement is such that the tie-down device is capable to moving vertically relative to the straps between fixed limits so that the front end of the vehicle floats on its own suspension. The straps are of a length and cross-sectional size which permit them to yield a slight amount when the tie-down device contacts either the upper or lower surface of the straps and thereby provides a cushioning effect for retarding vertical movement in either direction of the vehicle front-end.

The objects of the present invention are to provide an apparatus that maintains a vehicle in position on a transporter and incorporates a restraint device which allows the suspension system of the vehicle to absorb shock loads created by inertial movement of the vehicle; to provide a yieldable restraint device having a pair of straps which support a vehicle tie-down device and allow the latter to move vertically between fixed limits; to provide a positioning and restraint apparatus which holds a vehicle on a transporter and has cushioning capabilities so as to prevent damage to the vehicle during transit thereof; to provide a restraint device for a three-point vehicle restraint system that enables the vehicle front end to move along two mutually perpendicular axes relative to the support floor between set limits while being cushioned during such movement.

Other objects and advantages of the present invention will be apparent from the following detailed description when taken with the drawings in which:

FIG. 3 is an enlarged view showing the yieldable restraint device which is a part of the positioning and restraint apparatus.

FIG. 4 is a sectional view taken on line 4—4 of FIG. 3;

FIG. 5 is an enlarged sectional view taken on line 5—5 of FIG. 3; and

FIG. 6 is an enlarged view partly in section taken on line 6—6 of FIG. 3.

Figure 1:
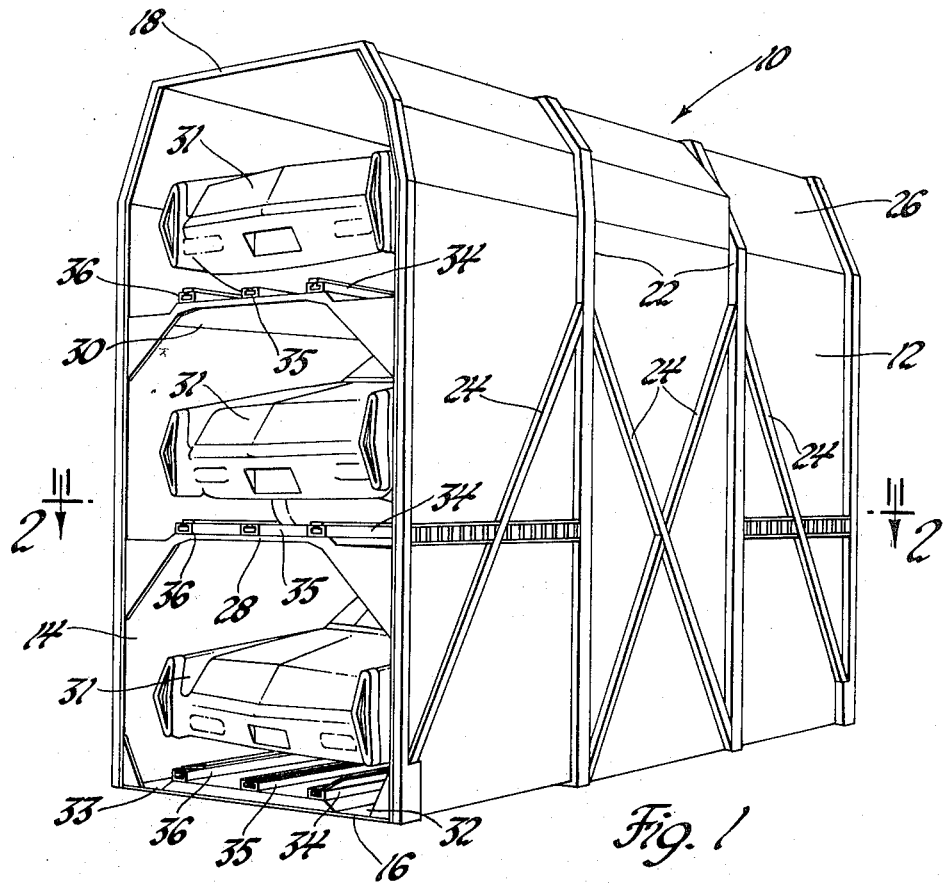
FIG. 1 is a perspective view showing a three-level vehicle shipping container incorporating a positioning and restraint apparatus made according to the invention.
Figure 2:
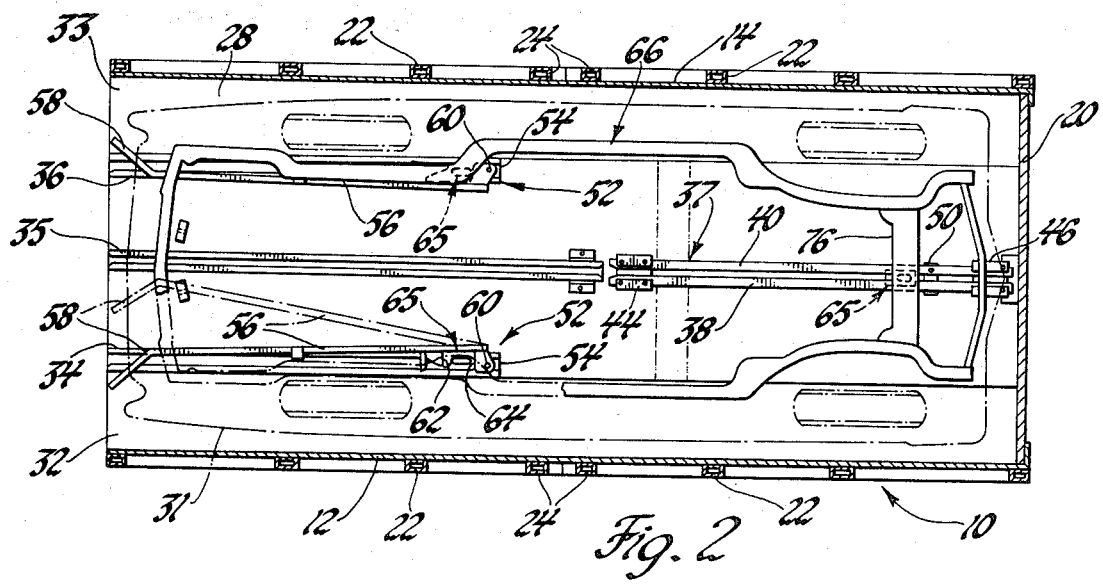
FIG. 2 is taken on line 2—2 of FIG. 1 and shows the positioning and restraint apparatus.

Referring to the drawings and more particularly FIGS. 1 and 2 thereof, a portable shipping container 10 is shown having laterally spaced parallel side walls 12 and 14, a bottom vehicle supporting floor portion 16, a roof portion 18, and an end wall 20. Each side wall 12 and 14 is reinforced by a plurality of vertical and diagonal structural members 22 and 24, respectively, and has an upper inwardly diverging section 26 which connects with the roof portion 18. The shipping container 10 also includes intermediate floor portions or decks 28 and 30, each of which is also adaptd to support a vehicle 31 in a manner as will be hereinafter described. The intermediate floor portions 28 and 30 are located in horizontal planes parallel to the bottom floor portion 16. Thus, a fully enclosed shipping container is provided with one end only open for reception of cargo which in this case is automotive vehicles. As shown, the shipping container 10 is capable of storing three vehicles, afterwhich the shipping container can be placed on a railway flat car and secured thereto for shipping purposes. Although not shown, the railway flat car would carry four shipping containers of the above-described type which would be placed in longitudinal alignment with the open ends of each pair of shipping containers facing each other so as to completely close each shipping container and thereby fully protect the vehicles from damage of the type which frequently occurs to exposed vehicles.

Each floor portion 16, 28, and 30 is substantially identical in construction and includes a pair of parallel wheel guide tracks 32 and 33 between which are located three elongated parallel guide rails 34, 35, and 36. Each of the guide rails takes the form of a C-shaped channel and is parallel to the side walls 12 and 14. The center guide rail 35 extends substantially one-half the length of the shipping container 10 from the open end thereof, while the outer guide rails 34 and 36 start at the open end of the shipping container and extend slightly more than one-third the longitudinal distance thereof. As seen in FIGS. 2, 3 and 4, the center guide rail 35 is longitudinally aligned with a yieldable restraint device 37 comprising a pair of elongated and laterally spaced straps 38 and 40 which are located in a horizontal plane that passes through the upper section of the guide rail 35. The end of each strap adjacent the guide rail 35 has an angled entrance surface 42 and is rigidly held in position by a support bracket 44 welded to the floor portion, while the other end of each strap is secured to the end wall 20 through a support bracket 46. It will be noted that as seen in FIGS. 2 and 4, the part of the floor portion supporting the guide rails 34, 35, and 36 and located between the guide tracks 32 and 33 is at a higher elevation than the remainder of the floor portion. Support bracket 46 is also at the higher elevation and positioned below the straps 38 and 40 is a skid plate 48 secured to the floor portion 16. It will also be noted that a cross bar 50 is provided intermediate the length of the straps 38 and 40 for interconnecting the latter and preventing any separation thereof due to forces encountered while the vehicle 31 is being shipped within the container 10.

As best seen in FIG. 2, each outer guide rail 34 and 36 carries a latch mechanism 52 at the inner end thereof which comprises a base 54 that serves as a stop and also a lock lever 56 having a handle 58 which is accessible from the open end of the shipping container 10. The inner end of the lock lever 56 is pivotally mounted to the base 54 by a pivotal connection 60 which permits the lock lever 56 to be rotated about a vertical axis passing through pivotal connection 60 between the full line and phantom line positions. The inner end of the lock lever 56 also carries a lock member which has longitudinally spaced stop sections 62 and 64 defined by a U-shaped cutout in the lock member. The function of the latch mechanism 52 is to lock a tie-down device 65 which travels in the associated guide rail, in position and prevent it from moving in a fore and aft direction.

In this regard, it will be noted that a frame 66 of the type associated with each of the vehicles 31 is shown in FIG. 2. The frame 66 is provided with three identical tie-down devices 65 such as shown in FIGS. 4 and 6, and comprising a T-shaped key or head portion 68, integrally formed with an upper base 70 which is joined by a vertically orientated connecting member 72 to a lower base 74. One of the tie-down devices 65 is fixed to the front cross member 76 of the frame 66 at the center thereof while the other two tie-down devices 65 are fixed to the frame 66 adjacent to the rear end thereof and inboard of the rear wheels. The key portion 68 of each tie-down device can be inserted within a suitable oblong aperture provided in the vehicle frame and locked thereto by rotating the tie-down device 90° so as to position a pair of laterally extending arms 78 and 80 in a direction parallel to the longitudinal axis of the frame 66. A more detailed explanation of the type of tie-down device which can be employed with this invention, as well as the latch mechanisms 52 for holding two of the tie-down devices can be obtained from the aforementioned U.S. patent application Ser. No. 187,625, filed Oct. 8, 1971, entitled "Vehicle Positioning and Restraint Apparatus" and assigned to the assignee of this invention.

The lateral spacing of the three tie-down devices 65 on the frame 66 corresponds with the lateral spacing of the three guide rails 34, 35, and 36 on each floor portion 16, 28, and 30. Accordingly, when a vehicle 31 is rolled into the shipping container 10 with the tires in the tracks 32 and 33, initially the tie-down device 65 carried by cross member 76 enters the center guide rail 35 and, after the vehicle has moved a sufficient distance into the shipping container 10 the latter mentioned tie-down device is received by the yieldable restraint device 37 as seen in FIGS. 3, 4 and 6. As the vehicle 31 continues to move into the container 10, the two rear tie-down devices 65 are received by the outer guide rails 34 and 36. The vehicle continues moving into the shipping container 10 until the rear tie-down devices 65 engage the stop (not shown) formed in the base 54 provided with each outer guide rail. At such time, the vehicle 31 is prevented from moving forwardly and assumes the position shown in FIG. 2. In this position, the rear end of the vehicle 31 is restrained from vertical as well as lateral movement and upon moving the lock lever 56 of each latch mechanism 52 toward the associated guide rail, the rear tie-down devices 54 are restrained from longitudinal movement due to the trapping action which occurs when the lock member assumes the full line position of FIG. 2. At such time, the rear of the vehicle 31 is completely restrained and the front end of the vehicle is supported by the yieldable restraint device 37.

It will be noted that as seen in FIGS. 4 and 6, the tie-down device 65 carried by the cross member 68 is shown in its normal or neutral position and has its upper base 70 and lower base 74 spaced vertically from the straps 38 and 40. It will also be noted that the latter-mentioned tie-down device is not locked in position through any means such as the latch mechanism 52 associated with the rear tie-down devices. As a result, the front end of the vehicle 31 is able to move upwardly and downwardly on its own suspension springs the vertical length of the connecting member 72. Also, because of the length and cross-sectional size of the straps 38 and 40, the latter serve as resilient members to allow some additional upward and downward movement of the tie-down device even after the latter bottoms on the upper or lower surface of the straps. Thus, the yieldable restraint device 37 allows the front end of the vehicle to pitch or float upwardly and downwardly about a horizontal axis passing through the retaining slots for the rear tie-down devices, and in this manner causes the front suspension of the vehicle to absorb the high inertial loads imposed on the vehicle as it is being transported in the container 10 by a railway car. Finally, it will be noted that due to the size and configuration of the straps 38 and 40, a slight amount of lateral or side to side movement of the front end of the vehicle car also can be tolerated and during such movement the straps may torsionally deflect and thereby cushion the lateral movement of the vehicle front end.

From the above description, it will be apparent that the size and shape of the straps 38 and 40 employed with the yieldable restraint device 37 will be dependent upon the size and weight of the vehicle 31. One yieldable restraint device used successfully had a pair of straps each of which measured one-quarter inch in thickness, one and three-quarter inches in width, and ninety-six inches in length. The straps were made from S.A.E. 1090 steel or the equivalent and the vehicle 31 had a front wheel weight of approximately 2,700 pounds and a rear wheel weight of approximately 2,350 pounds.

Various changes and modifications can be made in this construction without departing from the spirit of the invention. Such changes and modifications are contemplated by the inventors and they do not wish to be limited except by the scope of the appended claims.

We claim:

1. A positioning and restraint apparatus for securing a vehicle to the floor portion of a carrier, comprisng a pair of laterally spaced parallel tracks for the wheels of said vehicle, three elongated guide rails fixed to said floor portion between said tracks along laterally spaced axes parallel to the longitudinal axes of said tracks, said guide rails adapted to slidably receive a pair of tie-down devices attached to said vehicle adjacent the rear end thereof and a tie-down device attached to the front end of the vehicle, a latch mechanism operatively associated with each of the outer two of said three guide rails for restraining said pair of laterally spaced tie-down devices from movement along the longitudinal axis of said outer two guide rails when the vehicle is in a predetermined position on said floor portion, and a yieldable restraint device carried by said floor portion and axially aligned with the guide rail located between said outer guide rails and adapted to receive the tie-down device attached to the front end of the vehicle, said yieldable restraint device including a pair of opposed surfaces allowing said tie-down device attached to the front end of the vehicle to move from a neutral position up and down and be resiliently cushioned from movement beyond fixed limits so as to permit the front end of the vehicle to float on its own front suspension while being transported by the carrier.

2. A positioning and restraint apparatus for securing a vehicle to the floor portion of a carrier, comprising a pair of laterally spaced parallel tracks for the wheels of said vehicle, three elongated guide rails fixed to said floor portion between said tracks along equally spaced axes parallel to the longitudinal axes of said tracks, said guide rails adapted to slidably receive a pair of tie-down devices attached to said vehicle adjacent the rear end thereof and a tie-down device attached to the front end of the vehicle for restraining the vehicle from movement in a vertical direction, a latch mechanism operatively associated with each of the outer two of said three guide rails for restraining said pair of tie-down devices from movement along the longitudinal axis of said outer two guide rails when the vehicle is in a predetermined position on said floor portion, and a yieldable restraint device carried by said floor portion and axially aligned with the guide rail located between said outer guide rails and adapted to receive the tie-down device attached to the front end of the vehicle, said yieldable restraint device including a pair of elongated straps allowing said tie-down device attached to the front end of the vehicle to move up and down and be resiliently cushioned by said straps from movement beyond fixed limits so as to permit the front end of the vehicle to float on its own suspension while being transported by the carrier.

3. The positioning and restraint apparatus of claim 2 wherein said straps are laterally spaced and lie in a common horizontal plane.

4. A container for shipping vehicles, the container having an open end and a plurality of vertically spaced floor portions enclosed by a pair of side walls, an end wall and a roof, each of said floor portions being located in a substantially horizontal plane and having positioning and restraint means for securing a vehicle thereto, a pair of laterally spaced parallel tracks on said floor portion for accommodating the wheels of said vehicle, said positioning and restraint means comprising three elongated guide rails fixed to each of said floor portions between said tracks along axes parallel to the longitudinal axes of said tracks, said guide rails being C-shaped in cross-section and adapted to slidably receive a pair of T-shaped tie-down devices attached to said vehicle adjacent the rear end thereof and a T-shaped tie-down device attached to the front end of the vehicle, a latch mechanism operatively associated with each of the outer two of said three guide rails for restraining said pair of T-shaped tie-down devices from movement in a vertical direction and along the longitudinal axis of said one of said tracks, said latch mechanism including a hand-operated lever accessible from said open end of the container and being formed with a pair of longitudinally spaced stop sections adapted to trap said tie-down device to prevent movement thereof along said longitudinal axis, and a yieldable restraint device carried by said floor portion and axially aligned with the guide rail located between said outer guide rails and adapted to receive the tie-down device attached to the front end of the vehicle, said yieldable restraint device including a pair of laterally spaced elongated straps allowing said tie-down device attached to the front end of the vehicle to move up and down about a transverse axis passing through said pair of tie-down devices and be resiliently cushioned by said straps from movement beyond fixed limits so as to permit the front end of the vehicle to float on its own suspension while being transported in the container.

* * * * *